United States Patent [19]

Thomas et al.

[11] Patent Number: 4,918,427

[45] Date of Patent: * Apr. 17, 1990

[54] MULTI-LEVEL TOOL BREAK DETECTION USING MULTI-MODE SENSING

[75] Inventors: Charles E. Thomas, Scotia; Steven R. Hayashi, Schenectady; Douglas G. Wildes, Ballston Lake, all of N.Y.

[73] Assignee: General Electric Company, Schenectady, N.Y.

[*] Notice: The portion of the term of this patent subsequent to May 16, 2006 has been disclaimed.

[21] Appl. No.: 329,044

[22] Filed: Mar. 27, 1989

[51] Int. Cl.4 ............................................. G08B 21/00
[52] U.S. Cl. .................................... 340/680; 340/683; 73/104; 73/660
[58] Field of Search ................. 340/680, 683; 73/104, 73/660

[56] References Cited

U.S. PATENT DOCUMENTS

| 4,636,779 | 1/1987 | Thomas et al. | 340/680 |
| 4,636,780 | 1/1987 | Thomas et al. | 340/680 |
| 4,831,365 | 5/1989 | Thomas et al. | 340/680 |

FOREIGN PATENT DOCUMENTS 2140951 12/1984 United Kingdom ............... 340/680

OTHER PUBLICATIONS

S. R. Hayashi et al, "Automatic Tool Touch and Breakage Detection in Turning", Sensors '85, Detroit, SME.

Primary Examiner—Joseph A. Orsino
Assistant Examiner—Jeffery A. Hofsass
Attorney, Agent, or Firm—Henry I. Steckler; James C. Davis, Jr.; Paul R. Webb, II

[57] ABSTRACT

A system and method for monitoring machine tool operations provides a multi-level tool break alarm and uses information from multiple sensors of different types. Signal processing and pattern recognition logic techniques are applied to a cutting process high frequency vibration signal to detect major tool breaks requiring prompt stoppage of the cut. False alarm resistant detection of minor tool breaks, for which the response may not be an immediate stop of the cutting process, is obtained with information from a low frequency vibration sensor, an axis drive current sensor, or an axis velocity sensor. A minor tool break alarm is generated when signal transients in both a high frequency and low frequency channel signal are in close time coincidence, and a major alarm when the high frequency channel transient is followed by a persisting mean vibration level shift.

16 Claims, 9 Drawing Sheets

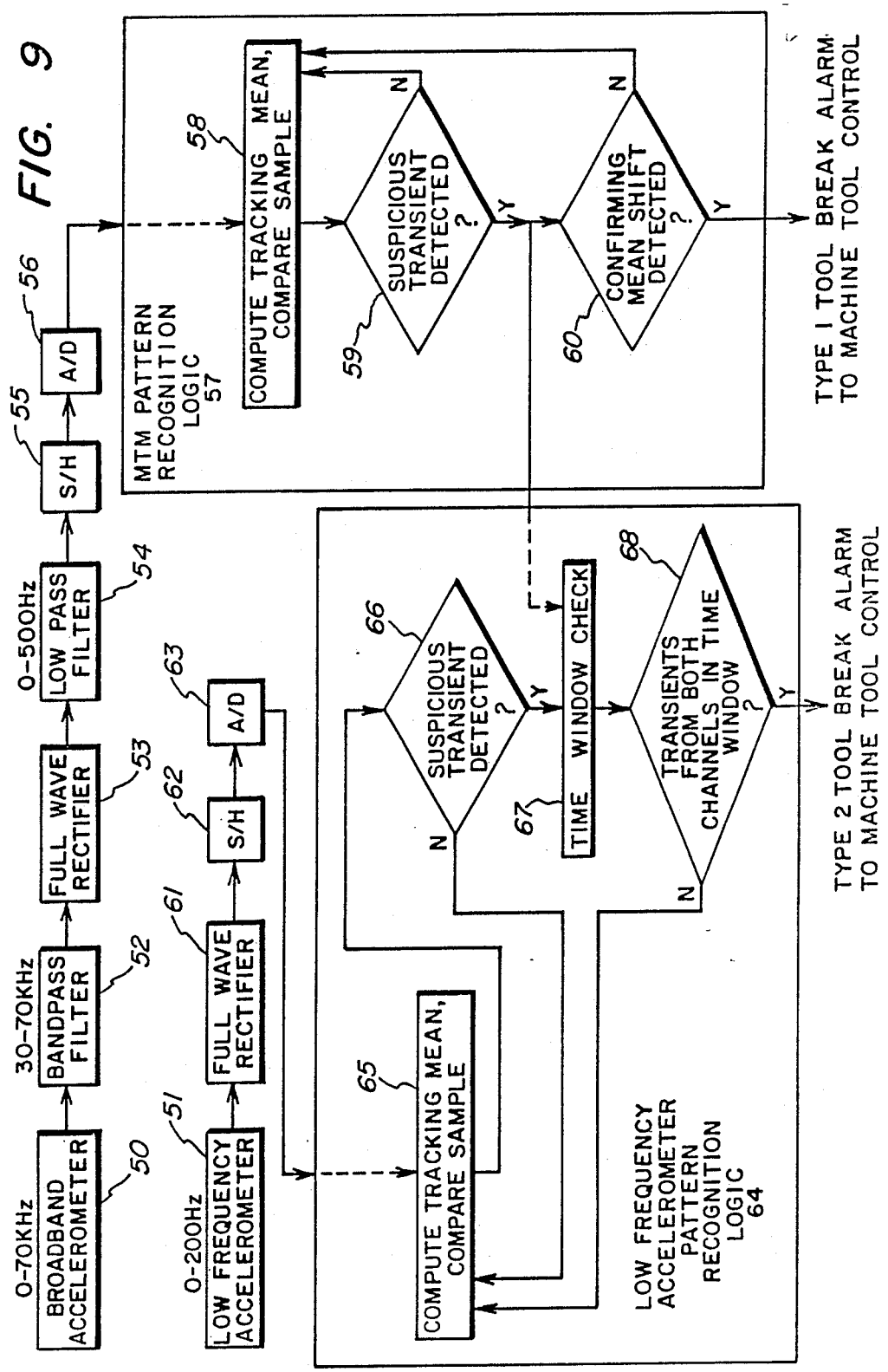

MULTI-LEVEL TOOL BREAK DETECTION USING MULTI-MODE SENSING

BACKGROUND OF THE INVENTION

This invention relates to a system and method for monitoring machine tool operations to detect different classes of tool breaks that may and may not require interruption of the cutting process.

The phenomenon of cutting tool breakage is a major obstacle to the automation of machining processes. In most machining operations that have no automatic tool break detection system, it is necessary to have an operator for each machine tool to promptly detect took break events and take action to prevent them from causing serious damage to the workpiece or the machine tool, or from putting a computerized numerical control (CNC) machine into a situation resulting in repeated tool breaks caused by excessive depth of cut at the point where the break occurred. Automation of the machining operation, with lower levels of human surveillance of individual machine tools, requires the automation of the tool break and machine response functions. A Machine Tool Monitoring (MTM) system has been developed for the automation of these functions and is covered by many commonly assigned patents and copending applications. It senses high frequency vibrations generated by the cutting process, and applies signal processing and pattern recognition logic techniques to detect major tool break events that make an immediate significant change in cutting conditions that is reflected in a major shift in the mean vibration level. In order to avoid false alarm problems from normal cutting artifacts in the vibration signature, it deliberately ignores other tool break events that do not make an immediate significant change in cutting conditions.

The MTM system was originally developed for applications using hard but brittle ceramic tools in aggressive cutting of tough aerospace materials, and therefore it assumed that each cut would be made with a new cutting edge. Under these circumstances it is not only acceptable, but actually preferable, to have the automatic tool break detection system ignore tool breaks that do not make an immediate significant change in cutting conditions. However, in most machining applications, tool cutting edges are used for several successive cuts before a tool change is made. This change in operating conditions changes the desired functionality of the automatic tool break detection system. Now, when a tool breaks and does not immediately change cutting conditions very much, it is usually desirable to replace the tool at least before the start of the next scheduled cut.

Two different types of situations of this type have been encountered. Ceramic tools, including fibre-reinforced ceramic tools, occasionally suffer delamination breaks that do not have much effect on the cutting process. However, they weaken the tool and make it more likely to break on the next cut. Both ceramic and carbide tools sometimes suffer major fractures, but are held together by cutting forces for some time after the fracture, with little effect on cutting conditions. When the cutting forces are relieved at the end of the cut, or when they undergo changes at the start of the next cut, the different pieces of the fractured tool separate and one or more of them may fall away. Thus, cutting conditions may be radically changed by the tool break, but the change may not take place until long after the initial tool fracture event. The MTM tool break detection system tends to ignore the initial tool fracture in these cases, and generally will not alarm until cutting conditions change. If this change does not take place until the start of the next scheduled cut, MTM may have some difficulty detecting it at all because there is no normal cutting period on that cut, and MTM basically looks for changes from the assumed normal pre-break cutting conditions to the assumed abnormal post-break conditions.

For most automated machining operations, in which tools are used for several successive cuts between tool changes, an automated tool break detection system is needed with the capability of detecting not only tool breaks that result in an immediate major change in cutting conditions, but also tool breaks that do not do so, but should nonetheless cause the tool to be replaced before the next cut is started. The MTM system is very flexible, and it can be adjusted to detect many of the tool breaks that do not cause an immediate major change in cutting conditions. Only a few such tool breaks, where the tool fracture transient is obscured by normal cutting noise, cannot be detected. The major problem with this solution is that, in order to set the MTM system to alarm on tool fracture transients not followed by vibration signal indications of a major change in cutting conditions, it is necessary to significantly increase the probability of false alarms from normal cutting vibration signal artifacts that mimic the tool fracture vibration signatures.

Systems that use information in a vibration signal and in another signal sensing another physical quantity for purposes of tool break and wear detection have been proposed. Copending allowed application Ser. No. 153,300, filed Feb. 5, 1988, C. E. Thomas, D. G. Wildes, and M. Lee, "Cutting Tool Wear Detection Apparatus and Method", utilizes a spindle power or force signal to detect tool wear and a specific type of tool break, namely crumble breaks of ceramic tools. It also makes use of both high frequency and low frequency vibration signals for the same purposes. It does not utilize fast transients in any of these signals and is not designed to detect abrupt tool fracture events. British patent No. 2,140.951A discloses that three machining parameters, ultrasonic emission by the cutting process, main drive power, and feed drive power, provide for a clear differentiation between process irregularities and tool breakage. A simultaneous abrupt variation of the measured values of all three parameters indicates a tool break, and a concurrent variation of two of the three parameters for a predetermined time indicates a process irregularity.

SUMMARY OF THE INVENTION

An object of the invention is to reliably and automatically identify, with a low false alarm rate, all cutting tool breaks including those that do and do not produce major immediate changes in cutting conditions.

Another object is to provide the user of a numerical control machine tool with the capability of specifying different responses of the controller-machine tool-tool changer system to different classes of tool break events to meet the needs of any application.

Yet another object is the provision of an improved apparatus and method for detecting major cutting tool breakage requiring immediate attention to stop the cut in progress, and less readily detected minor tool breaks for which an optimum response of the machine tool control is not necessarily an immediate stop of the cutting process.

The improved tool break detection system of this invention is comprised of means for sensing vibrations generated by interaction of a cutting tool and workpiece and deriving a high frequency vibration signal in a range between 30 KHz and 100 KHz, and means for sensing one or more parameters which are sensitive to force acting on the cutting tool during the cutting process and producing a low frequency signal, dc to less than 1 KHz. The first sensor is typically a broadband vibration sensor, and the second a low frequency vibration sensor, a machine tool axis drive current sensor, or an axis velocity sensor. Alternatively both signals are extracted from the output of a single broadband vibration sensor. Means are provided for preprocessing, sampling and digitizing each of these signals and respectively computing first and second tracking means from a given number of previous samples. The system further comprises pattern recognition logic in each channel to detect signal transients that may be caused by a tool break. Alarm means determines that transients in said first and second mean signals are in close time coincidence and occur in a designated time window, and generates a minor type tool break alarm.

Other features of the system are that the pattern recognition logic in the high frequency channel has provision for checking that the detected signal transient in the first mean vibration signal is followed by a substantial and persisting mean level shift due to a large change in cutting conditions. A major type tool break alarm requiring an immediate stop of the cutting process is then generated. The time window to detect close coincidence between suspicious transients in the first and second mean signals is, for instance, a small fraction of a workpiece revolution, and the persisting level shift of the first mean signal to trigger a major tool break alarm lasts longer than one workpiece revolution.

Another aspect of the invention is an improved method of detecting different classes of tool breakage. Vibrations generated at the cutting tool workpiece interface and at least one parameter related to forces acting on the tool are sensed, and a high frequency channel signal indicative of the amplitude of vibrations in a chosen high frequency band and a low frequency channel signal are derived. These signals are sampled and the samples are converted to digital values, and tracking means are computed. A transient in the high frequency channel mean signal which is a suspicion of a tool break, and another transient in the low frequency channel signal which may be a confirmation of the tool break, are detected. Upon determining that detected transients in both channels are in close time coincidence, a minor tool break alarm is generated, and if not the logic is reset to look for another suspicious transient. The high frequency channel mean is further processed following detection of the suspicious transient to check for an abrupt, substantial and persisting shift in mean vibration level due to a major change in cutting conditions and hence generate a major tool break alarm; otherwise the logic is reset to search for a large transient.

The user is free to assign different control actions to the two different types of alarms. In the event of a minor tool break the part program may specify to continue to the end of the present cut, or until a major alarm occurs, whichever comes first, and before starting a new cut the tool is changed. A major tool break alarm ordinarily requires an immediate stop of the cut. Other responses tailored to fit a particular situation may be made.

BRIEF DESCRIPTION OF THE DRAWINGS

FIG. 9 is a block diagram and flowchart of the improved machine tool monitoring system with a multilevel tool break alarm and multiple sensors.

DETAILED DESCRIPTION OF THE INVENTION

Figure 1:
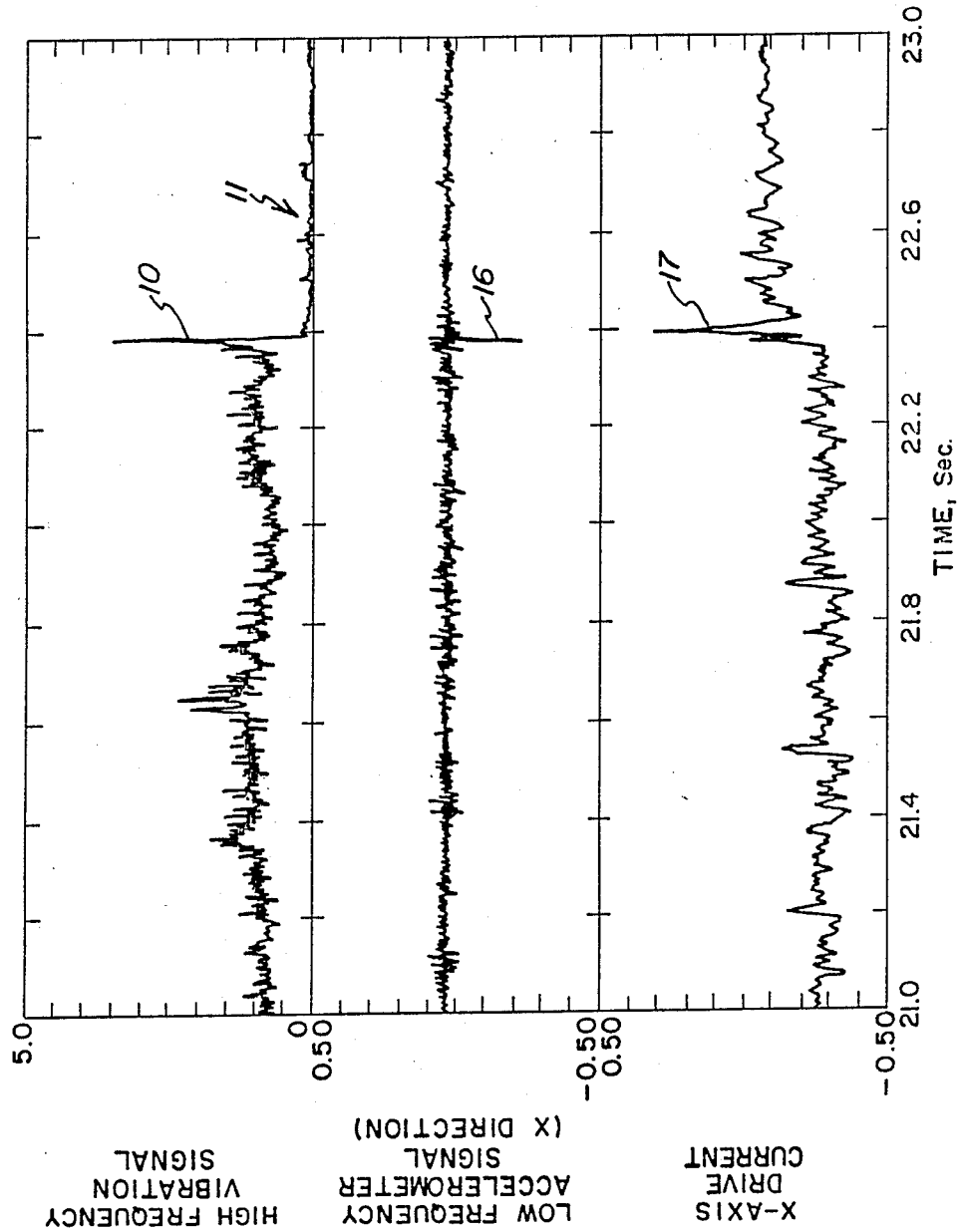
FIGS. 1 and 2 relate to tool breaks that cause immediate major changes in cutting conditions; the upper curves in both figures are high frequency vibration signatures with abrupt shifts in mean signal level, the middle curves in both figures are low frequency accelerometer signals, and the lower curves show, respectively, axis drive current and axis velocity signals.
Figure 2:
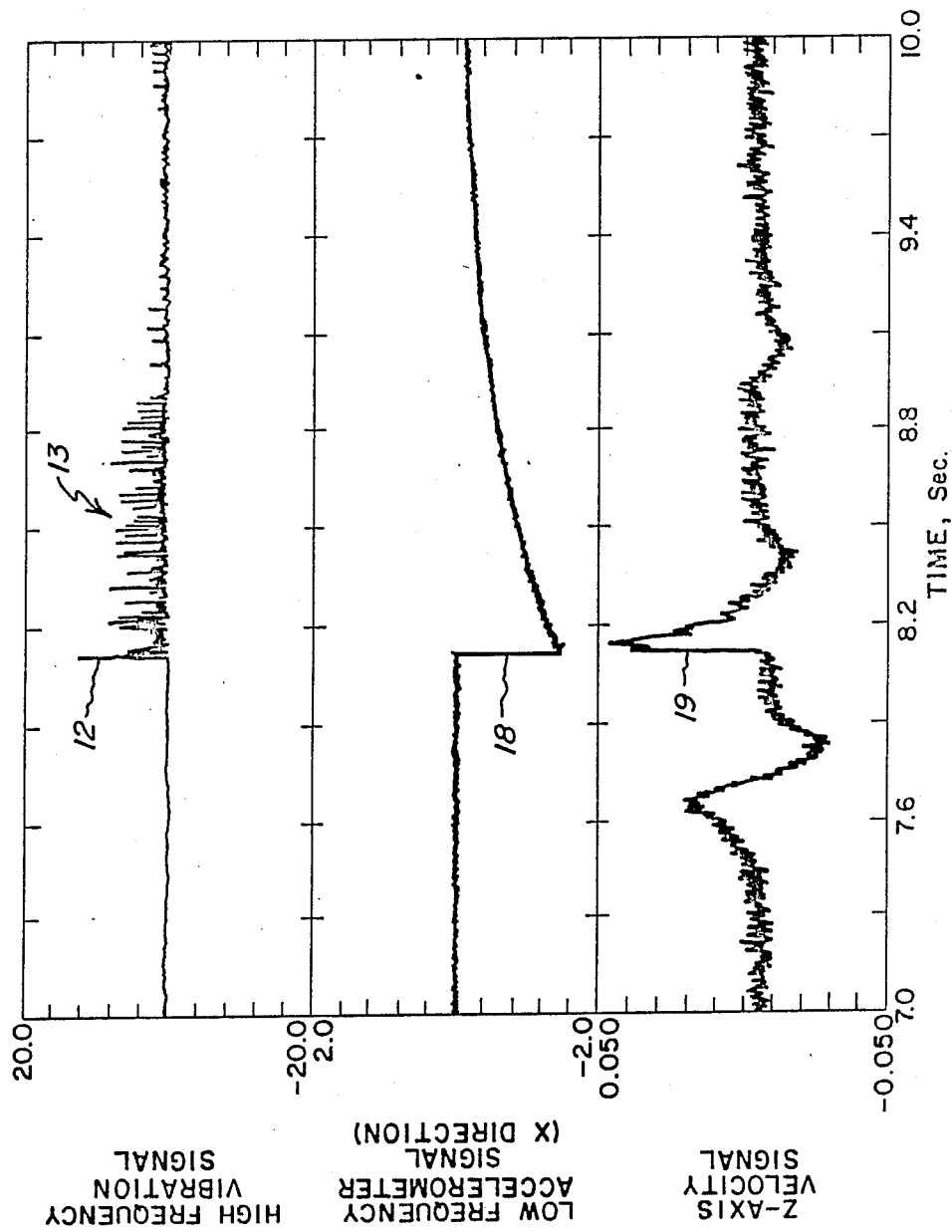
Figure 3:
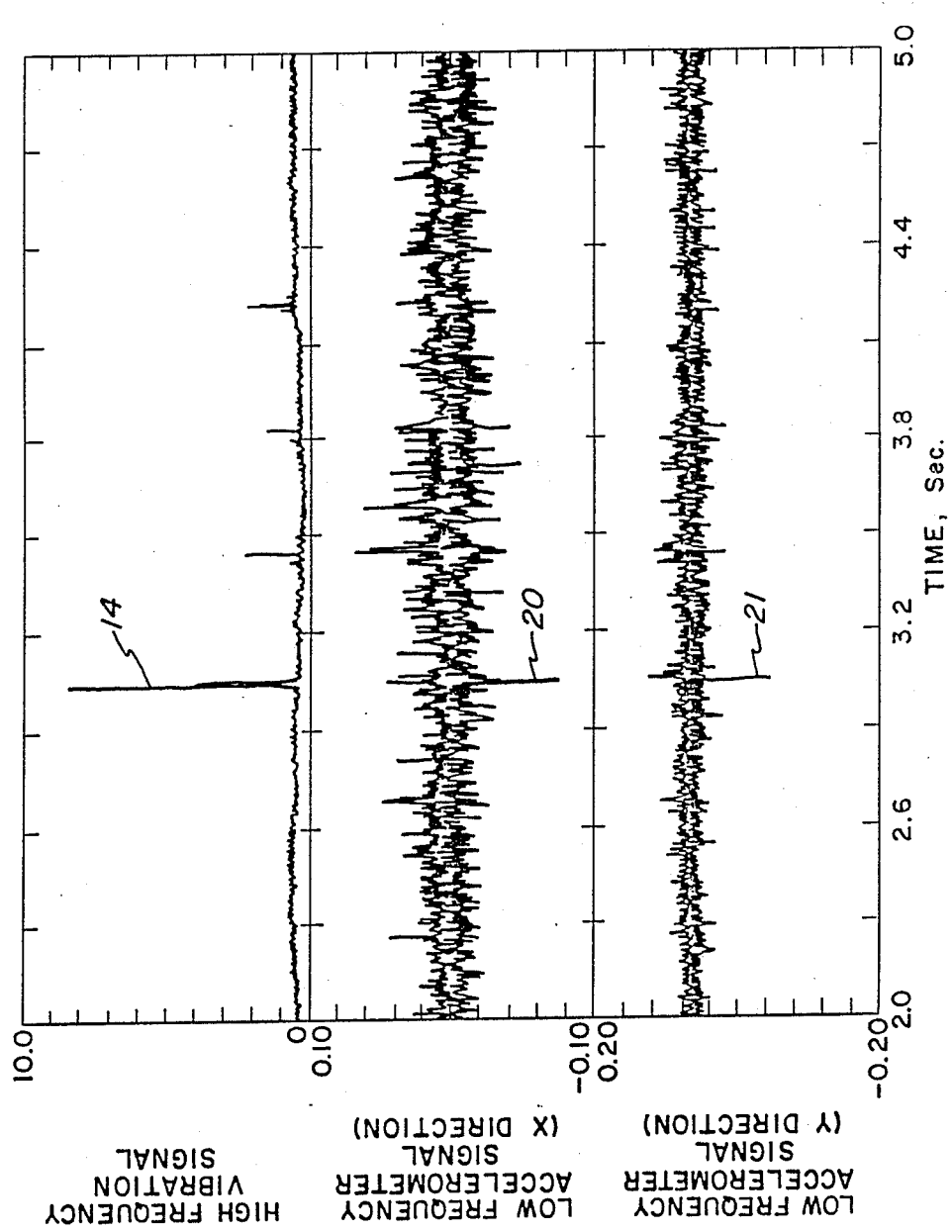
FIGS. 3 and 4 relate to tool breaks that do not result in an immediate change in cutting conditions; the upper curves in both figures are high frequency vibration signatures that do not include major mean level shifts, the middle curves in both figures are low frequency accelerometer signals, and the lower curves show, respectively, an orthogonal low frequency accelerometer signal and an axis drive current.

The upper traces in FIGS. 1 and 2 show two examples of high frequency vibration signatures of tool breaks that do cause immediate major changes in cutting conditions that, in turn, cause major abrupt shifts in the mean vibration level. FIG. 1 shows the vibration signature of a major break of a round fiber-reinforced ceramic tool used in turning operations. A high amplitude, fast-rising signal transient 10 is followed by a substantially lower vibration signal level 11 which persists for longer than a chosen confirmation period, usually longer than one revolution of the workpiece. FIG. 2 shows in the upper curve a vibration signature of a major break of a diamond-shaped carbide tool, also used in turning operations. This characteristic tool break signature has a high amplitude signal transient 12 that is immediately followed by a substantial and persisting increase in signal level with many noise spikes, indicated at 13. These and several other types of tool break signatures showing abrupt shifts in the mean vibration signal level have been observed for breaks of these and other tool types. The upper traces in FIGS. 3 and 4, on the other hand, show lathe tool break vibration signatures that do not include major mean level shifts. FIG. 3 was obtained on a delamination break of a fiber-reinforced ceramic tool. The vibration level before and after the large transient 14 is substantially the same because there is no significant change in cutting conditions due to the tool breakage. The upper trace in FIG.

Figure 5:
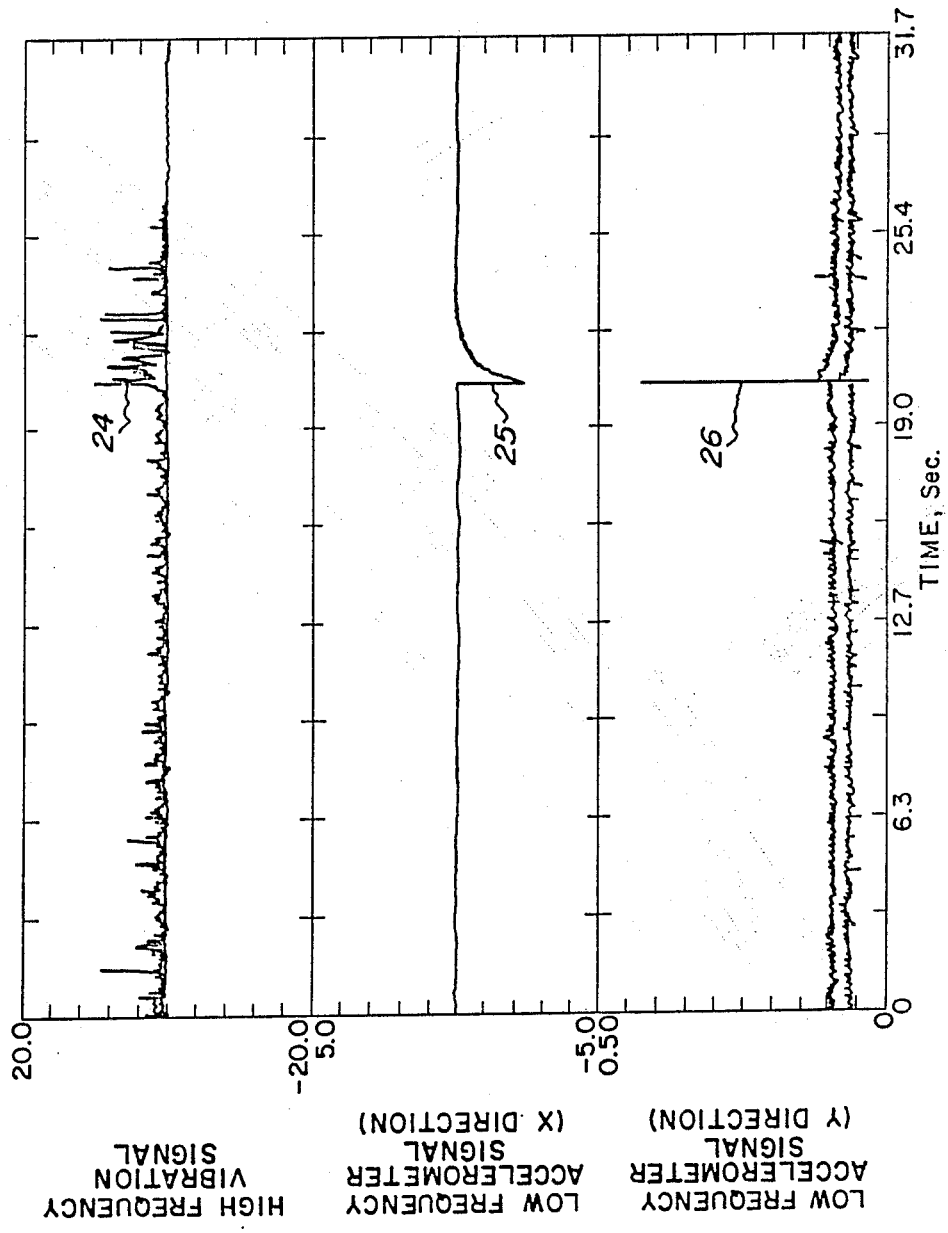
FIGS. 5 and 6 relate to tool break events that produce time-coincident transients in both the high frequency and low frequency vibration channels; the upper curves in both figures are high frequency vibration signals, and the middle and lower curves in both figures are orthogonal low frequency accelerometer signals.
Figure 6:
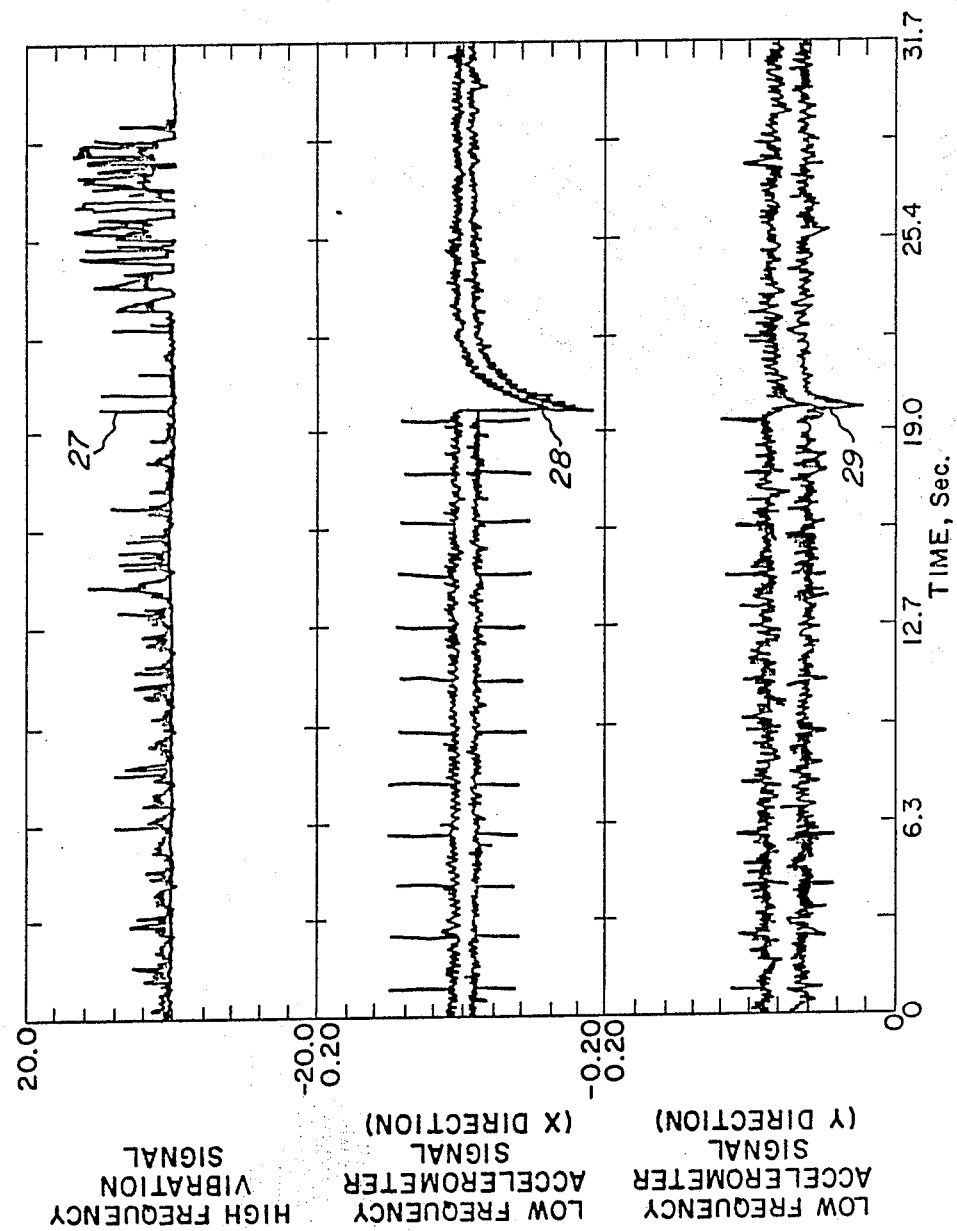

4 was obtained on a major fracture of a diamond-shaped carbide tool that did not result in an immediate change in cutting conditions because the tool fragments formed by the fracture event were held together by cutting forces. The signal level before and after high amplitude transient 15 is approximately the same. All of the traces in these figures, as well as FIGS. 5 and 6, are the raw sensor output before any signal processing and computation of a tracking mean.

Figure 4:
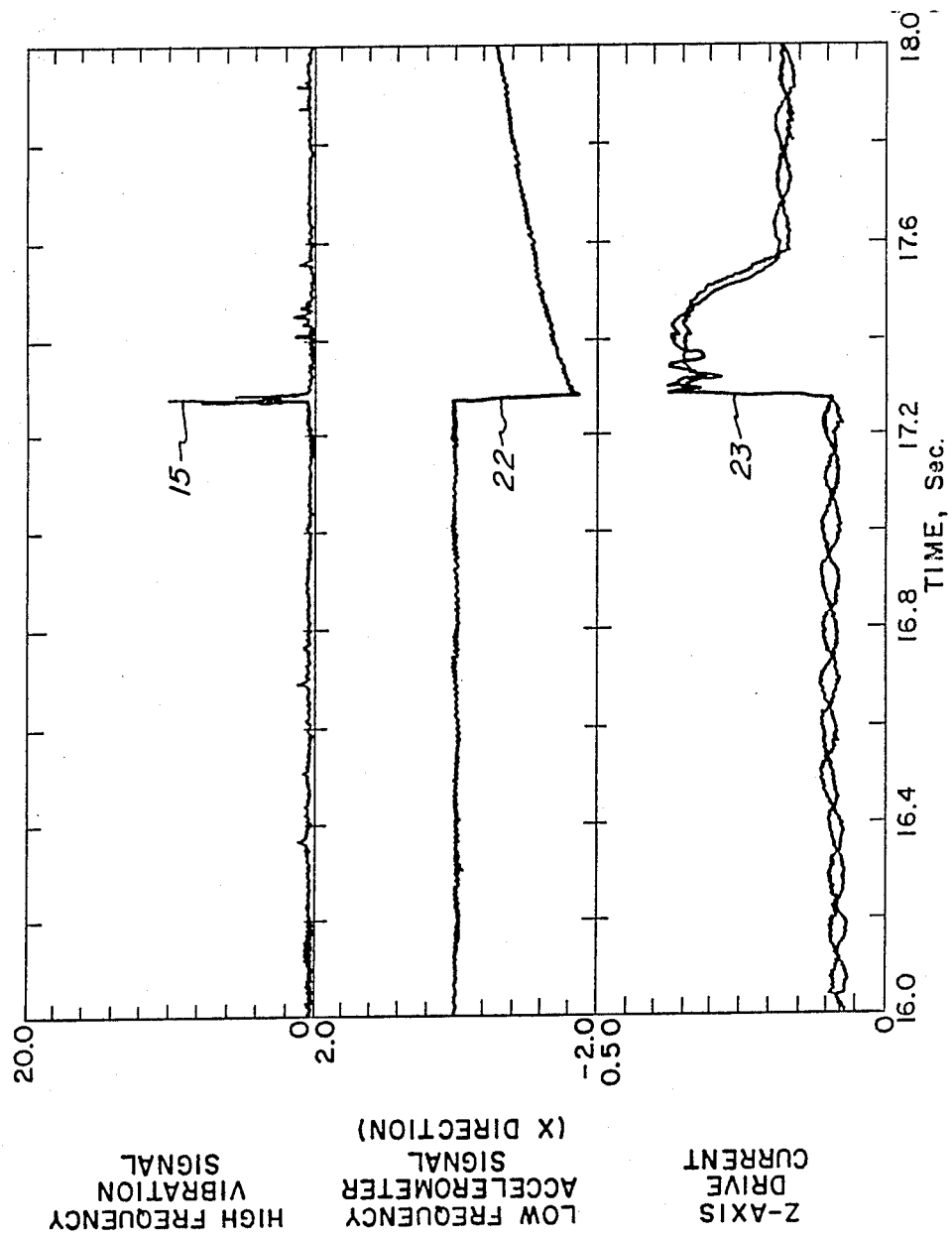

The middle and lower traces of FIGS. 1-4 show the output signals from various other sensors in the regions of the tool break events. In each case, sensor signals displaying transients time-coincident with the tool break events have been chosen for the figures. All the tool break events that have been studied have shown transient disturbances of one (X direction) or both (X and Y direction) of the low frequency accelerometer signal traces at the timing of the tool break events. In all cases except those of relatively minor ceramic tool delamination breaks, transients have also been noted in other sensor signals including various machine tool axis drive currents and velocities. Thus in FIG. 1 there are transients 16 and 17 in the low frequency vibration signal and X-axis drive current, and these transients are in close time coincidence with the transient 10 in the high frequency vibration signal. FIG. 2 has time-coincident transients 18 and 19 in the low frequency accelerometer signal and Z-axis velocity signal. In FIG. 3, transients 20 and 21 in the outputs of orthogonally mounted low frequency vibration sensors occur in a small time window. FIG. 4 very clearly illustrates the time coincidence of transients 15, 22 and 23 in the high frequency vibration signal, low frequency accelerometer signal and Z-axis drive current. The other sensors that have been enumerated have the common feature that all measure parameters which are sensitive to forces on the cutting tool or, alternatively put, generate signals that are related to forces acting on the cutting tool. Another commonality is that all share a common low frequency range, dc to less than 1 KHz.

As these figures indicate, high frequency vibration signal transients are sensitive indicators of tool break events, including most events that do not cause immediate major changes in cutting conditions. Although there are rare instances in which such tool break events may fail to produce detectable high frequency vibration signal transients, the principle problem in attempting to detect all tool break events by real time high frequency vibration signal analysis is the overlap between the characteristics of normal machining signal transients and those produced by tool break events that do not produce major immediate changes in cutting conditions. This overlap produces opportunities for false alarms. A similar problem exists using any other single sensor as the sole indicator of tool break events.

This invention solves this fundamental problem by dividing tool break events into two classes: those that do, and those that do not, produce immediate major detectable changes in cutting conditions. Tool break events that do produce immediate major detectable changes in cutting conditions are detected by essentially the existing MTM (machine tool monitor) tool break detection system analyzing high frequency vibration signals. This subsystem separates signal transients caused by tool breaks from those that are normal cutting signal artifacts by requiring for a tool break alarm that the suspicious transient be followed by a mean vibration level shift meeting predetermined criteria of amplitude change, persistence, and maximum delay after the suspicion. It thus rejects not only normal cutting signal artifacts, but also tool break events that do not make immediate major changes in cutting conditions. Refer to U.S. Pat. No. 4,636,779, C. E. Thomas et al. "Acoustic Detection of Tool Breaks Events in Machine Tool Operations", and U.S. Pat. No. 4,636,780, C. E. Thomas et al., "Acoustic Monitoring of Cutting Conditions to Detect Tool Break Events", the disclosures of which are incorporated herein by reference.

In order to also provide for the detection of tool break events that do not produce immediate major changes in cutting conditions, this invention provides an alternative means and technique for confirming or rejecting suspicious transients in the high frequency vibration signal flagged by the MTM subsystem. A parallel analysis channel monitors a low frequency vibration sensor signal, or signals from two orthogonally-mounted low frequency vibration sensors, and detects transients in that signal or one of those signals. A tool break alarm is generated when suspicious transients are detected in both the high frequency vibration signal channel and a low frequency vibration signal channel in close time-coincidence. Alternatively the signals of an axis drive current sensor or axis velocity sensor may be monitored.

Study of sensor signal traces such as those in FIGS. 1-4 indicate that events that produce time-coincident transients in both channels are much less likely to be false alarms than are events producing transients in either channel without a time-coincident transient in the other channel. FIG. 5 shows an example for a diamond-shaped carbide lathe tool break. The high frequency vibration signal in the upper curve shows an abrupt transient 24 at the tool break time, approximately 20 seconds on the time scale, but also shows relatively high amplitude transients both earlier and later. The X direction and Y direction low frequency accelerometer signals, the middle and lower curves, show transients 25 and 26 only at the time of the tool break. Another diamond-shaped carbide lathe tool break event produced the signals of FIG. 6. Here the high frequency vibration signal shown in the top trace has many transients, including a transient 27 at the time of the tool break just beyond 19 seconds on the time scale. The X and Y direction low frequency accelerometer signals shown in the lower two traces have major transients 28 and 29 at the time of the tool break. They also show short transients occurring repetitively, once per spindle revolution, before the tool break occurs, but it would be easy for a detector to be designed to detect the long tool break transients and ignore these shorter normal-cutting transients. In this case, only the longer low frequency accelerometer signal transients would be used to confirm the tool break indication in the high frequency vibration signal.

The minor tool break alarm produced in this manner can be separated from the major alarm produced by the high frequency vibration signal or MTM portion of the total tool break detection system, and the user is free to assign different machine tool/tool changer control actions to the two types of tool break alarms. One choice, consistent with the previously described classification of tool break types is as follows. First, if the high frequency vibration signal, MTM portion of the system generates a major tool break alarm, immediately stop the cut, back out and change the tool, probe the new tool to measure its exact dimensions, repeat the incomplete cut, and proceed to the next scheduled cut. Second, if the combined high frequency channel and low frequency channel transient detector generates a minor tool break alarm, do nothing until the end of the present cut or a subsequent major alarm occurs, whichever comes first. Before starting a new cut, change the tool, probe the new tool and proceed to the next scheduled cut. Other responses that may better fit the needs of particular applications are possible and can be implemented by the user through appropriate part program and numerical control software. For example, in the case where a minor tool break alarm is generated, the user may elect to probe the suspect tool before deciding that it really must be replaced. Probing the tool is described in the technical paper, "Automatic Tool Touch and Breakage Detection In Turning", S. R. Hayashi et al., Sensors '85, Nov. 5-7, 1985, Detroit (a SME publication), and in commonly assigned patents.

Figure 7:
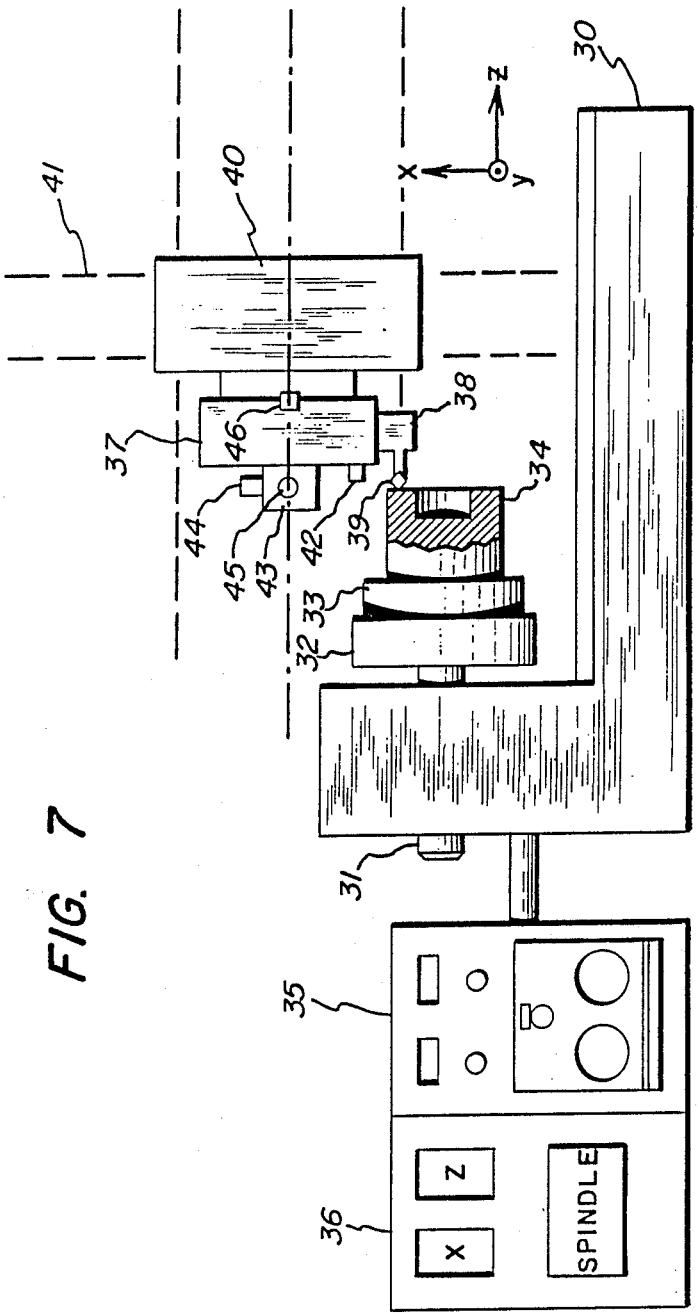
FIG. 7 is a partial elevation view of a horizontal turret lathe showing broadband and low frequency accelerometer locations; axis drive current and velocity are measured in the machine tool motor controller.

FIG. 7 is a simplified drawing of a horizontal turret lathe; the improved tool break detection system has application to other machine tools such as vertical turret lathes, milling machines, and drills. The illustrated parts are the machine frame 30, spindle shaft 31, chuck 32, fixture 33 for holding the workpiece 34, and a NC control station 35 and motor controller 36 for the X-axis, Z-axis and spindle motors. A rotatable tool turret 37 has several tool posts 38 to support the tool holder and tool insert 39. The turret 37 is supported on a turret mount 40 which in turn has movement alone along two cross slides 41.

Figure 8:
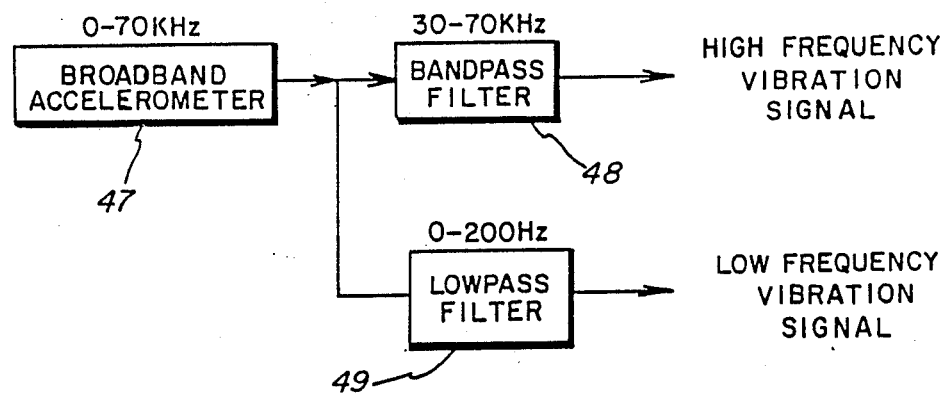
FIG. 8 is a block diagram illustrating derivation of both the high frequency vibration signal and low frequency accelerometer signal from a single broadband accelerometer.

A broadband accelerometer 42 is mounted directly on the face of rotatable turret 37, and a small metal block 43 fastened to the turret face supports low frequency accelerometers 44 and 45 to sense X and Y direction vibrations. The latter may be 0-200 Hz devices and two are utilized because low frequency vibrations are by their nature directional. Alternatively, only one low frequency accelerometer is often sufficient. A single set of two or three sensors can monitor any tool holder position the operator selects for the cutting operation. A rotating electrical coupler 46 is provided to transfer the electrical signals outputted by the transducers to stationary electronics. Other sensors, such as axis drive current sensors and axis velocity sensors, may be substituted or supplement the above. The X-axis drive current is the current fed to motors on the X-axis drive, and the Z-axis velocity is the linear velocity of turret mount 40 in the Z or spindle axis direction and is equal to the linear velocity of the cutting tool in the Z-direction. Such sensor signals are directly available in motor controller 36. These other sensors sense a parameter related to forces acting on the cutting tool and all share a common frequency range between dc and 1 KHz. Typically different types of sensors are employed, but an exception is that both the high frequency vibration signal and a low frequency accelerometer signal may be derived from a single broadband accelerometer signal as shown in FIG. 8. Here the signal generated by a 0-70 KHz broadband accelerometer 47 is bandpass filtered at 48 to yield a 30-70 KHz high frequency vibration signal, and is low pass filtered at 49 to yield a 0-200 Hz low frequency vibration signal.

FIG. 9 is a block diagram and flowchart of the improved tool break detection system for detecting tool breakage that does and does not cause an immediate change in cutting conditions. This illustrative system has a broadband accelerometer 50 and one low frequency accelerometer 51. In the high frequency channel the raw sensor signal is presented to a bandpass filter 52 which attenuates machine tool noise that tends to be concentrated at the lower frequencies. The energy in the 30-70 KHz vibration signal is detected by the combination of a full wave rectifier 53 and lowpass filter 54. The cutoff frequency of the lowpass filter is typically 500 Hz or less to prevent aliasing from the subsequent sampling operation as long as the sampling frequency is well above the 1 KHz Nyquist frequency. The output of the analog preprocessor is a unipolar high frequency channel signal indicative of the amplitude of vibrations in the chosen high frequency band. The first part of the digital processor is a sample-and-hold circuit 55 which samples the analog waveform at, say, 2 KHz and an analog-to-digital converter 56 which converts the samples to digital values. The amplitude of these samples is analyzed in real time by the MTM or high frequency channel pattern recognition logic 57.

Referring to block 58, a tracking mean is computed by averaging N previous samples, where N may be 16, and every new sample is compared with the tracking mean to search for a higher amplitude transient in the high frequency channel mean signal which may be caused by and give rise to a suspicion of a tool break. If a suspicious transient is detected at block 59, the mean signal is further processed to check for an abrupt and substantial shift in mean signal level, either an increase or decrease in the mean, that persists for a prechosen confirmation period longer than one workpiece revolution. A confirmation of the suspicion and a persisting shift in mean vibration level due to a major change in cutting conditions, results in generating a major type 1 tool break alarm which is sent to the machine tool control. The major type alarm requires an immediate stop in the cutting process and retraction of the cutting tool to prevent damage to the workpiece and machine tool.

In the low frequency channel, the 0-200 Hz signal generated by low frequency accelerometer 51 is minimally processed. The unipolar signal from full wave rectifier 61 is presented to a sample-and-hold circuit 62 and the samples are converted to digital values by the analog-to-digital convertor 63. The low frequency accelerometer pattern recognition logic 64 first calls for, at 65, computing a tracking mean from a given number of previous samples, say 16, and comparing the new sample with the tracking mean. Proceeding to blocks 66-68, upon detecting a suspicious transient in the digitized low frequency channel mean signal that may be caused by a tool break, a time window check is made to determine whether detected high frequency and low frequency channel transients are in close time-coincidence and occur in the designated time window. Preferably this time window is no longer than a small fraction of one workpiece revolution. The start of the time window may be initiated by a suspicious transient in the high frequency channel, or by detection of a suspicious transient in either channel. When transients from both channels are in close time coincidence and occur in the time window, a minor type 2 tool break alarm is generated and sent to the machine tool control. The logic is reset at block 66 to continue the search, sample by sample, for a suspicious transient in the low frequency channel mean signal if none has been detected. Likewise, at block 68 the suspicion of a tool break is dismissed and the search begins anew if the suspicious transient in the high frequency channel is not confirmed by detection of an approximately concurrent suspicious transient in the low frequency channel.

Greater reliability in the detection of minor tool breakage that does not cause an immediate change in cutting conditions is secured by having two or more low frequency channels operating in parallel, either of which will produce a minor tool break alarm when the suspicious transient in the high frequency vibration signal is approximately time-coincident with a detected transient in that low frequency channel signal. Six possible combinations of sensors are shown in the drawings; these and others are within the scope of this invention. As was discussed, various control actions may be taken following the type 2 minor tool break alarm except that such an alarm can never override a type 1 major tool break alarm. Often no action is taken until the end of the cut but on delicate work a minor break might be risky and immediate stoppage of the cut is advisable. This is particularly the case toward the end of machining an expensive workpiece.

While the invention has been particularly shown and described with reference to preferred embodiments thereof, it will be understood by those skilled in the art that various changes in form and details may be made without departing from the spirit and scope of the invention as defined in the appended claims.

What is claimed is:

1. A machine tool monitoring system for detecting cutting tool breakage that does and does not cause an immediate major change in cutting conditions, comprising:
   means for sensing vibrations generated by interaction of a cutting tool and workpiece and deriving a high frequency vibration signal having a frequency in a range between 30 KHz and 100 KHz;
   means for sensing at least one parameter related to forces acting on the tool during a cutting process and producing a low frequency signal having a frequency less than about 1 KHz;
   means for preprocessing, sampling and digitizing each of said signals and respectively computing first and second tracking mean signals from a given number of previous samples;
   pattern recognition means for detecting signal transients that may be caused by a tool break; and
   alarm means for determining that transients in said first and second mean signals are in close time coincidence and occur in a designated time window, and generating a minor tool break alarm.

2. The system of claim 1 wherein said pattern recognition means further comprises logic for determining that the signal transient in said first mean signal derived from said high frequency vibration signal is followed by a substantial and persisting shift in mean level due to a major change in cutting conditions, and said alarm means comprises means for generating a major tool break alarm requiring an immediate stop of the cutting process.

3. The system of claim 2 wherein said time window to detect close coincidence between transients in said first and second mean signals is a small fraction of one workpiece revolution, and said persisting level shift of said first mean signal to trigger the second type alarm lasts longer than one workpiece revolution.

4. The system of claim 2 wherein said means for sensing vibrations is a broadband vibration sensor and said means for sensing at least one parameter related to forces acting on the tool is a low frequency vibration sensor.

5. The system of claim 2 wherein said means for sensing vibrations is a broadband vibration sensor and said means for sensing at least one parameter related to forces acting on the tool comprises two orthogonally mounted low frequency vibration sensors.

6. The system of claim 2 wherein said means for sensing vibrations is a broadband vibration sensor and said means for sensing at least one parameter related to forces acting on the tool is a machine tool axis drive current sensor.

7. The system of claim 2 wherein said means for sensing vibrations is a broadband vibration sensor and said means for sensing at least one parameter related to forces acting on the tool is a machine tool axis velocity sensor.

8. A machine tool monitoring system for detecting cutting tool breakage that does and does not cause an immediate major change in cutting conditions, comprising:
   a broadband vibration sensor for sensing vibrations generated by interaction of a cutting tool and workpiece and producing an electrical signal having a frequency less than about 100 KHz, and means for extracting therefrom high and low frequency vibration signals and preprocessing the same;
   means for sampling and digitizing each of said vibration signals and respectively computing first and second tracking mean vibration signals from a given number of previous samples;
   pattern recognition means for detecting signal transients that may be caused by a tool break; and
   alarm means for determining that the transients in said first and second mean vibration signals are in close time coincidence and occur in a designated time window, and generating a tool break alarm.

9. The system of claim 8 wherein said pattern recognition means further comprises logic for determining that the signal transient in said first mean signal derived from said high frequency vibration signal is followed by a substantial and persisting shift in mean level due to a major change in cutting conditions, and said alarm means comprises means for generating a major tool break alarm requiring an immediate stop of the cutting process.

10. A method of detecting different classes of tool breaks comprising:
    sensing vibrations generated at a cutting tool-workpiece interface on a machine tool during a cutting operation and generating an electrical signal, from which is derived a high frequency channel signal indicative of the amplitude of vibrations in a chosen high frequency band;
    sensing at least one parameter related to forces acting on the cutting tool and producing a low frequency channel signal;
    sampling and digitizing each of said signals and respectively computing high and low frequency channel tracking mean signals from a given number of previous samples;
    detecting a transient in said high frequency channel mean signal which is a suspicion of a tool break, and another transient in said low frequency channel mean signal which may be a confirmation of the tool break;
    determining that said first-recited and second-recited transients are in close time coincidence, and generating a minor tool break alarm.

11. The method of claim 10 further comprising digitally processing said high frequency channel mean signal following detection of the suspicious transient to check for an abrupt and substantial shift in mean signal level that persists for a preselected period due to a major change in cutting conditions, and generating a major tool break alarm.

12. The method of claim 11 wherein said sensing at least one parameter related to forces acting on the cutting tool comprises sensing low frequency vibrations generated at the tool-workpiece interface and generating a second electrical signal from which said low frequency channel signal is derived.

13. The method of claim 11 wherein said sensing at least one parameter related to forces acting on the cutting tool comprises sensing a machine tool axis drive current from which said low frequency channel signal is derived.

14. The method of claim 11 wherein said sensing at least one parameter related to forces acting on the cutting tool comprises sensing a machine tool axis velocity from which said low frequency channel signal is derived.

15. The method of claim 11 wherein said sensing at least one parameter related to forces acting on the cutting tool comprises using a broadband accelerometer to sense vibrations and filtering the electrical signal to extract a low frequency signal from which said low frequency channel signal is derived.

16. The method of claim 11 wherein said chosen high frequency band is above 30 KHz but below 100 KHz, and said low frequency channel signal is derived from a dc to 1 KHz signal.

* * * * *